United States Patent [19]

Norota

[11] Patent Number: 4,590,662
[45] Date of Patent: May 27, 1986

[54] TOOL CHANGING MACHINE OF MACHINE TOOL

[75] Inventor: Kenji Norota, Machida, Japan

[73] Assignee: Makino Milling Machine Co., Ltd., Tokyo, Japan

[21] Appl. No.: 527,302

[22] Filed: Aug. 29, 1983

[30] Foreign Application Priority Data

Sep. 3, 1982 [JP] Japan .................... 57-152600
Apr. 15, 1983 [JP] Japan .................... 58-65607

[51] Int. Cl.⁴ .......................................... B23Q 3/157
[52] U.S. Cl. ...................................... 29/568; 211/105; 414/736
[58] Field of Search ................ 29/568, 264, 426.3, 29/40; 408/35; 414/736; 211/1.5

[56] References Cited

U.S. PATENT DOCUMENTS

| | | | |
|---|---|---|---|
| 3,163,291 | 12/1964 | Gleisner, Jr. | 29/568 X |
| 3,286,344 | 11/1966 | Brainard et al. | 29/568 |
| 3,779,391 | 12/1973 | Sato et al. | 29/568 X |
| 4,110,898 | 9/1978 | Yamaoka et al. | 29/568 |
| 4,237,598 | 12/1980 | Williamson | 29/568 |
| 4,344,221 | 8/1982 | Pagani | 29/568 |

FOREIGN PATENT DOCUMENTS

| | | | |
|---|---|---|---|
| 2137841 | 2/1972 | Fed. Rep. of Germany | 29/568 |
| 3022717 | 1/1982 | Fed. Rep. of Germany | 29/568 |
| 2391028 | 1/1979 | France | 29/568 |
| 0007888 | 1/1978 | Japan | 29/568 |

*Primary Examiner*—Z. R. Bilinsky
*Attorney, Agent, or Firm*—McAulay, Fields, Fisher, Goldstein & Nissen

[57] ABSTRACT

A tool changing machine of a machine tool, comprising a base, a plurality of cartridges which have a plurality of tools, a main tool magazine on the base, which has index positions for tool change and which has a rotatable circular magazine body on which the cartridges are supported so as to move in the radial directions, a mechanism for indexing the main tool magazine into the index positions, and a mechanism for moving the cartridges into the index position in the radial directions.

4 Claims, 13 Drawing Figures

TOOL CHANGING MACHINE OF MACHINE TOOL

BACKGROUND OF THE INVENTION

1. Field of the Invention

This invention relates to a tool changing machine of a machine tool, more particularly to a tool changing machine provided with a tool magazine with a plurality of tool cartridges, having tool sockets.

2. Description of the Prior Art

A machine tool with an automatic tool changing machine enables continuous, diverse machining of a workpiece by the selective use of various tools accommodated in the tool magazine.

A known tool changing machine comprises a tool magazine, which accommodates a plurality of tools and selectively brings the tools to a tool changing station, and a tool transferring device, which exchanges an indexed tool for a tool which is mounted on a spindle of the machine tool.

A conventional tool magazine is usually disc-shaped with tool sockets on the periphery of the disc or chain-like with tool sockets connected to each other in a chain fashion in these conventional tool magazine, however, to increase the number of the tools accommodated in the magazines, it is necessary to make the magazine larger, increasing the size of the tool changing machine. This in turn increases the necessary installation space of conventional tool changing machines.

There is also known a drum-type tool magazine which has a cylindrical body which is provided, on its outer periphery, with a plurality of cartridges having tool sockets, as disclosed in, for example, U.S. Pat. No. 3,715,801. Even this type of cartridge, however, has the drawbacks of difficult tool change and complex construction. A plane planar tool cartridge which has a plurality of tool sockets in a plane is disclosed in Japanese Unexamined Utility Model Publication (Kokai) No. 49-21672. This planar cartridge, however, needs a large space for the sliding movement of the tool magazine in the plane.

To feed a large number of tools without increasing the magazine size, it is known to convey to the tool magazine additional tools stored, for example, in a separate tool storage and to exchange those additional tools for the tools in the tool magazine.

An example of such a device comprises a carriage which moves between the tool storage and the machine tool with a plurality of additional tools and a means for individually exchanging the additional tools for the tools in the tool magazine, as disclosed, for example, in Japanese Examined Patent Publication (Kokoku) No. 53-21543. However, individual exchange of tools takes a long time and, accordingly, is inefficient.

Another example of such a device is disclosed in Japanese Unexamined Patent Publication (Kokai) No. 55-31576, in which the device has a carriage similar to the above and an auxiliary tool magazine which is exchanged with the main tool magazine of the tool changing machine. In this device, however, the entire tool magazine of the tool changing machine must be exchanged even when only some different tools are required. Further, in this device, replacement of a single broken or worn tool necessitates replacement of the entire tool magazine.

SUMMARY OF THE INVENTION

The primary object of the present invention is to eliminate the above-mentioned drawbacks of the prior art by providing a small and simple tool changing machine which enables easy tool change.

According to one aspect of the present invention, there is provided a tool changing machine of a machine tool with a spindle, comprising, a base, a rotatable main tool magazine having a magazine body which movably supports a plurality of tool cartridges for receiving tools, said tool cartridges rotating along and on a predetermined closed loop of track when the main tool magazine rotates, a means for indexing the main tool magazine into a predetermined angular position defining a first magazine index position; first guiding means on the base for defining first cartridge index positions and for movably guiding a desired cartridge which comes from the main tool magazine, a means on the base for moving a desired cartridge between the first guiding means and the main tool magazine, and a tool transferring means for effecting transfer of tools between the first guiding means and the spindle of the machine tool.

BRIEF DESCRIPTION OF THE DRAWINGS

Other features of the invention will become more apparent from the following description when taken in connection with the accompanying drawings in which.

DESCRIPTION OF THE PREFERRED EMBODIMENTS

Figure 1:
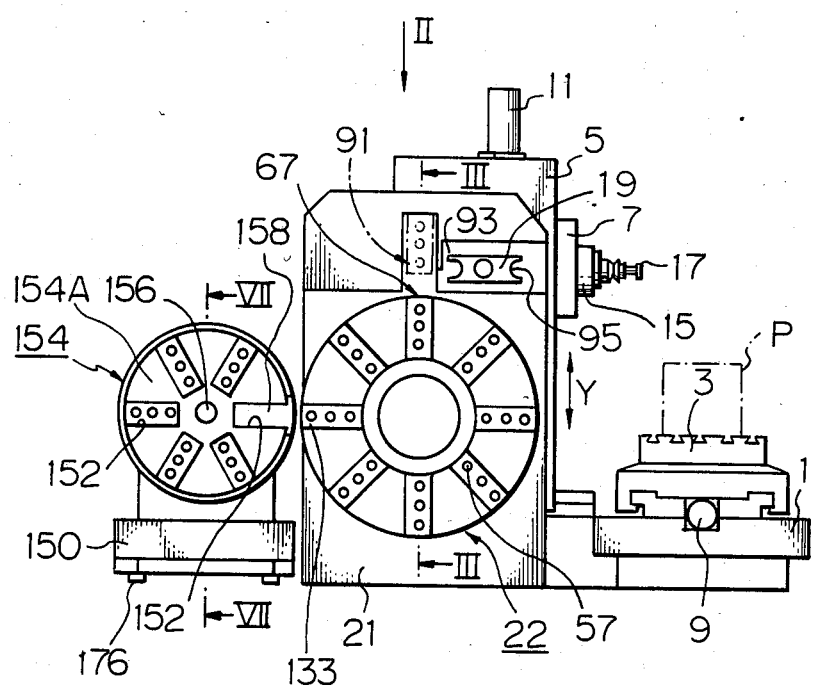
FIG. 1 is a front elevational view of a tool changing machine of a machine tool according to the present invention.
Figure 2:
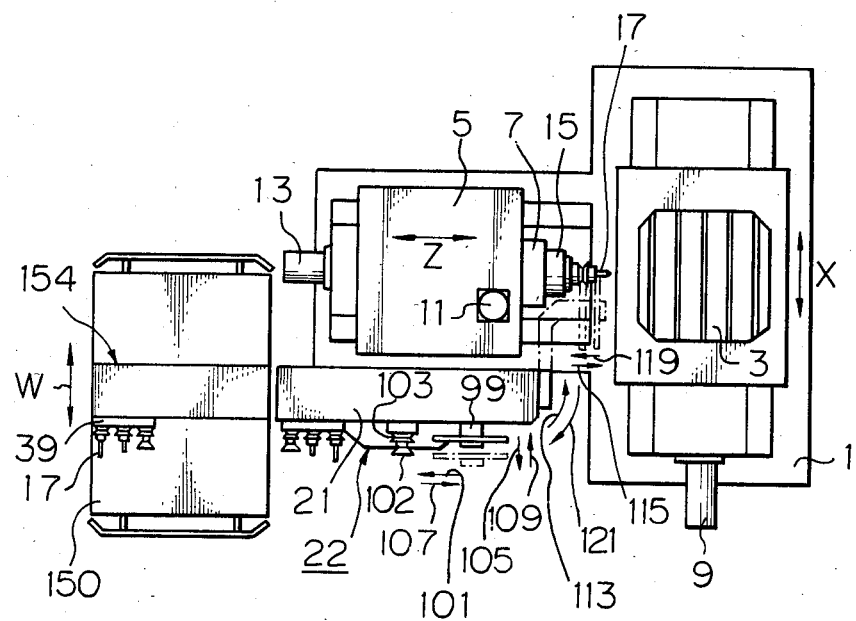
FIG. 2 is a plan view of FIG. 1 viewed from the direction of an arrow II in FIG. 1.

FIGS. 1 and 2 show a tool changing machine of a machine tool according to the present invention. The machine tool comprises a movable table 3 which can slide on a bed 1 in the x direction, a column 5 which is slidable in the z direction, and a spindle head 7 which is slidable in the y direction in front of the column 5. The table 3, the column 5, and the spindle head 7 are respectively moved by an X-axis drive motor 9, Z-axis drive motor 13, and Y-axis drive motor 11. The spindle head 7 has a horizontal spindle 15 rotatable thereto which has a tool 17 detachably attached to the front end thereof. A workpiece P is secured onto the table 3, for example, by a fastening device (not shown) and is machined by the tool 17 when relative movement in the X, Y, and/or Z directions occurs between the tool 17 and the workpiece P.

The tool changing machine essentially comprises a base 21 located on one side in the rear of the bed 1, an annular or circular main tool magazine 22 which is rotatably supported by the base 21 for an indexing operation and which has a large number of tools 17 accommodated therein, a tool changing arm 19 which transfers a predetermined tool stored in the tool magazine 22 to the spindle 15 and transfers the tool 17 held by the spindle 15 to a predetermined tool socket 57 in the main tool magazine, and an optional auxiliary tool magazine 154 carried on a carriage 150. As will be mentioned hereinafter, the auxiliary tool magazine 154 and the carriage 150 can be dispensed with in one aspect of the invention.

The carriage 150 is movable between one or a plurality of machine tools installed in a machine factory and a tool storage or tool chamber (which will be referred to as storage hereinafter) located separate from the machine tools. For the purpose of the movement, the carriage has wheels 176 or other carrying means, such as casters. Alternatively, the carriage may be suspended from guide rails running on the ceiling of the factory. The auxiliary tool magazine 154 supported on the carriage 150 has a plurality of cartridge receiving chambers 152 which receive therein individual cartridges 39. The magazine 154 has a circular body 154A capable of indexing and of rotating about a shaft 156, so that when the auxiliary tool magazine 154 comes to a tool change position close to the associated machine tool, it receives a cartridge 39 from the main tool magazine 22 in a vacant cartridge receiving chamber 152 and feeds a desired cartridge 39 into the main magazine 22 of the associated machine tool. In FIG. 1, the auxiliary magazine 154 is indexed into a cartridge receiving and transmitting position 158 where one vacant cartridge receiving chamber 152 is in alignment with the indexed cartridge of the main tool magazine so that the chamber 152 can receive the cartridge 39 from the main tool magazine 22. The carriage 150 moves in the direction designated by the arrow W, in the embodiment illustrated in FIGS. 1 and 2, to the storage or to another machine tool.

Figure 3:
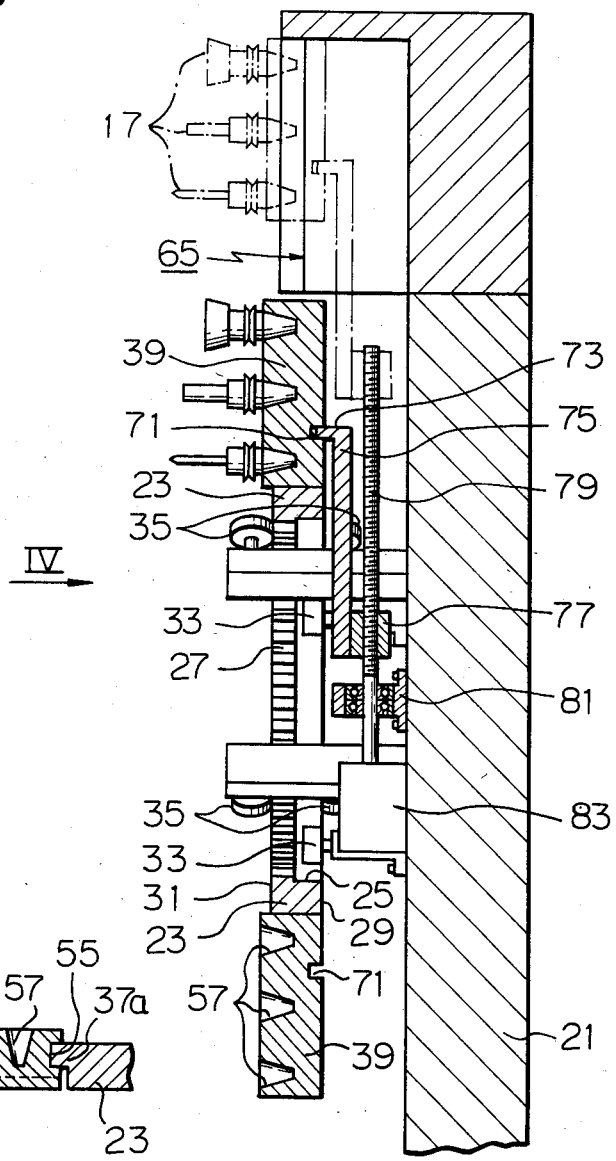
FIG. 3 is a sectional view of a main tool magazine taken along the line III—III in FIG. 1.
Figure 5:
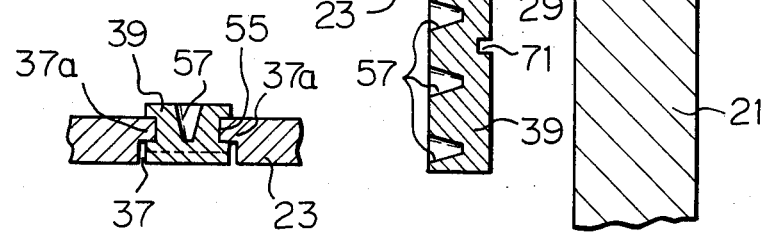
FIG. 5 is a sectional view of a cartridge taken along the line V—V in FIG. 4.
Figure 4:
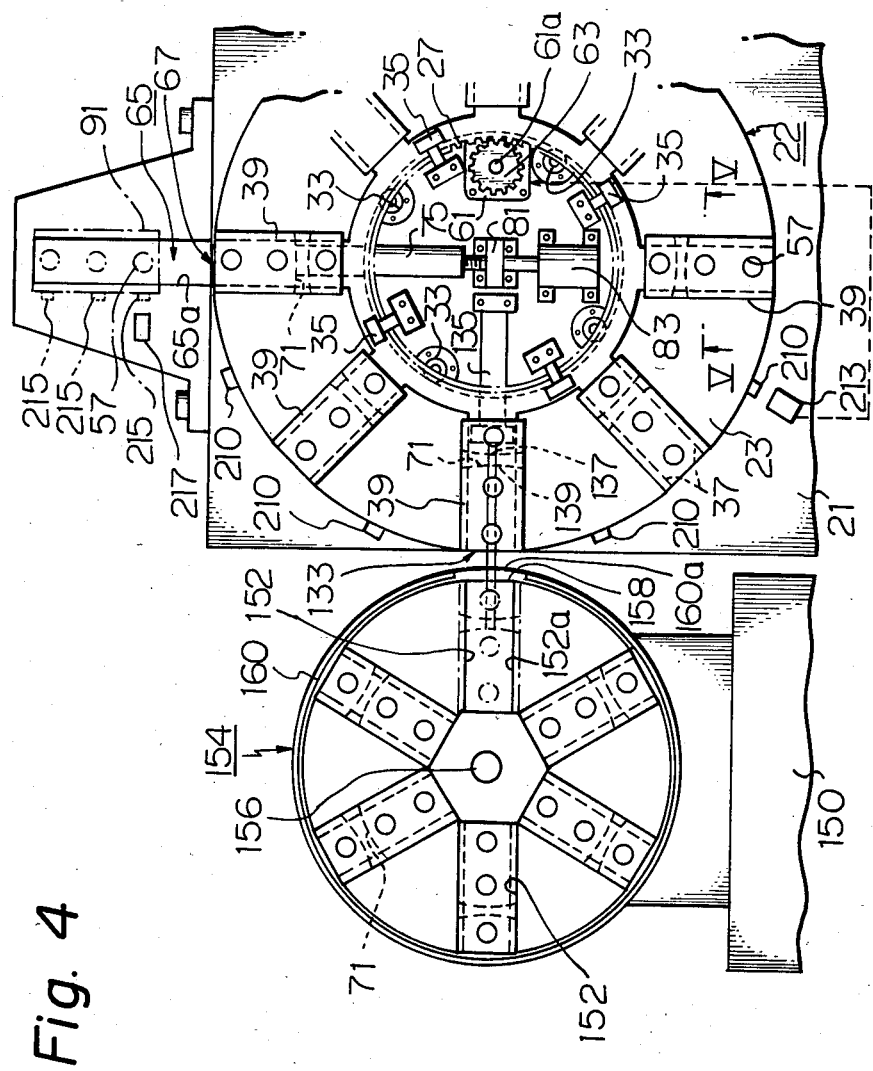
FIG. 4 is a front elevational view of FIG. 3 taken from the direction of an arrow IV in FIG. 3.

With reference to FIGS. 3, 4, and 5, in addition to FIGS. 1 and 2, the main tool magazine 22 has an annular magazine body 23 located in front of the base 21. The magazine body 23 has eight cartridges 39 each having three tool sockets 57. The cartridges 39 are substantially equiangularly spaced from one another in the peripheral direction and are radially located. The magazine body 23 has a central cylindrical inner wall 25 and a central inner peripheral gear 27. The magazine body 23 has flat end faces 29 and 31 viewed in the direction of the width thereof. The magazine body 23 is rotatably supported by four rolls 33, which are rotatably attached to the base 21 and which roll on the cylindrical wall 25, and by four pairs of rolls 35, each pair holding the magazine body 23 therebetween, so that the rolls 35 roll on the flat end faces 29 and 31 of the magazine body 23. The rolls 35 are rotatably attached to the base 21. The magazine body 23 has eight radially extending recesses 37 which receive therein the corresponding eight cartridges 39. Namely, the recesses 39 define receiving chambers for the cartridges 39.

The cartridges 39 have guide grooves 55 which come into engagement with wall portions 37a defining the recesses 37, so that the cartridges 39 can slide in the recesses 37 in the radial directions of the magazine body 23, if necessary, as shown in FIG. 5.

The tools are received in the tool sockets 57 and detachably secured therein. In the illustrated embodiment, since there are eight cartridges 39 each having three tool sockets 57, 24 tools can be accommodated in the main tool magazine 22. The number of the tools is, of course, not limited to 24, but can be increased or decreased by changing the number of the cartridge receiving chambers 37. Furthermore, the number of the sockets 57 of each of the cartridges 39 is not limited to three.

A magazine indexing motor 61 supported on the base 21 has a drive shaft 61a which has a gear 63 secured thereto and which meshes with the central inner gear 27 of the magazine body 23, so as to index the magazine body 23 into a desired angular position. On the upper portion of the base 21 is provided a first cartridge guide device 65 with a first cartridge receiving channel 65a which can receive a cartridge 39 which is in a first magazine index position 67.

Each of the cartridges 39 is provided, on its rear face, with a recess 71 in which is engaged an indexing lever 75 which has a projection 73 fitted in the recess 71. The projection 73 of the indexing lever 75 easily comes into the recess 71 of the cartridge 39 when the latter comes to the first index position 67, since the cartridges 39 rotate along and on a circular track when the magazine body rotates. The recess 71 has opposite ends in the form of a concave lens (FIG. 4) in plan view. The indexing lever 75 is movable up and down between the base 21 and the magazine body 23. The indexing lever 75 has a nut 77 which is secured to the lower portion of the lever 75 and which has a threaded bore (FIG. 3). In the threaded bore of the nut 77 is screwed a rotatable feed screw rod 79 which is rotatably supported by bearing device 81 fixed to the base 21 and which is connected to a cartridge indexing motor 83, so that when the motor rotates, the indexing lever 75 moves up and down by means of the feed screw rod 79. Thus, the cartridge 39 which has been brought into the first index position 67 can be fed into the first cartridge guide device 65, so that the cartridge comes to a tool changing position 91.

Any tool in the sockets 57 of the cartridge 39 which has been brought in the tool changing position (cartridge index position 91) in the first cartridge guide device 65 can be changed to a tool 17 which is held by the spindle 15 of the machine tool, by means of tool changing arm 19, which itself is known. That is, in FIGS. 1 and 2 the tool changing arm 19 has at its opposite ends grippers 93 and 95. The tool changing arm 19 moves in the left hand direction, as shown by the arrow 101, from an initial waiting position 99 (FIG. 2) so that the gripper 93 grasps a gripping portion 103 of the tool 102 accommodated in the tool socket 57 in the indexed cartridge 39 at the tool changing position 91. The tool changing arm 19 then moves forward in the direction shown by the arrow 105 to withdraw the tool 102 from the socket 57. After that, the arm 19 moves in the right hand direction shown by the arrow 107 and then in the direction shown by the arrow 109, while holding the tool 102, to come to the waiting position 99. That is, the tool changing arm 19 moves along a rectangular track, in a plan view (FIG. 2).

On the other hand, when the tool 17 attached to the spindle 15 completes the necessary machining, the spindle head 7 and the column 5 move along the Y axis and Z axis to the initial positions, whereupon the tool 17 is positioned for exchange. Then, the tool changing arm 19 rotates and moves along the direction designated by the arrow 113 until the gripper 95 grasps the tool 17. After the gripper 95 grasps the tool 17, the arm 19 moves forward in the direction designated by the arrow 115 to withdraw the tool 17 from the spindle 15. Then, the arm 19 rotates 180° about its own center axis, so that the new tool 102 comes in front of the spindle 15. The arm 19 moves backward in the direction designated by the arrow 119 to mount the tool 102 to the spindle 15. The arm 97 then moves along the curved track designated by the arrow 121, so that it is returned to the waiting position 99. The machine tool then begins machining by the new tool 102.

The old tool 17 held by the gripper 95 is inserted in the corresponding vacant tool socket 57 of the cartridge, which is indexed at the tool changing position 91, by means of the tool changing arm 19, which moves forward in the direction 105, in the direction 101, then backward in the direction 109. After that, the tool changing arm 19 moves in the right hand direction 107 to the waiting position 99. The cartridge having the old tool 17 is thus returned into the main tool magazine 22. After that, the tool magazine is indexed so that another new tool to be used for subsequent machining comes to the first index position 67.

The indexing of the desired cartridge 39 into the first index position 67 can be effected by controlling the rotation of the magazine indexing motor 61, for example, in accordance with a control signal of a proximity switch 213, per se known, which is provided on the base 21 and which detects the position of dogs 210 provided on the magazine body 23. Similarly, the desired socket 57 of the cartridge 39 can be brought to the tool changing position 91 in the first cartridge guide device 65 from the first index positon 67 by incorporation of a proximity switch 217 on the first cartridge guide device 65 and dogs 215 provided on the cartridges 39 to detect the position of the sockets 57, i.e., the tools therein. For clarification, only the dogs 215 on one cartridge 39 in the tool changing position 91 are shown in FIG. 4. Thus, a desired tool can be indexed into the tool changing position in which the tool can be held by the gripper 93 of the tool changing arm 19, when the arm 19 moves in the left hand direction 101, as mentioned before. The rotation of the cartridge indexing motor 83 is controlled in accordance with control signals from the proximity switch 217 to index the desired socket 57 into the tool changing position.

Figure 6:
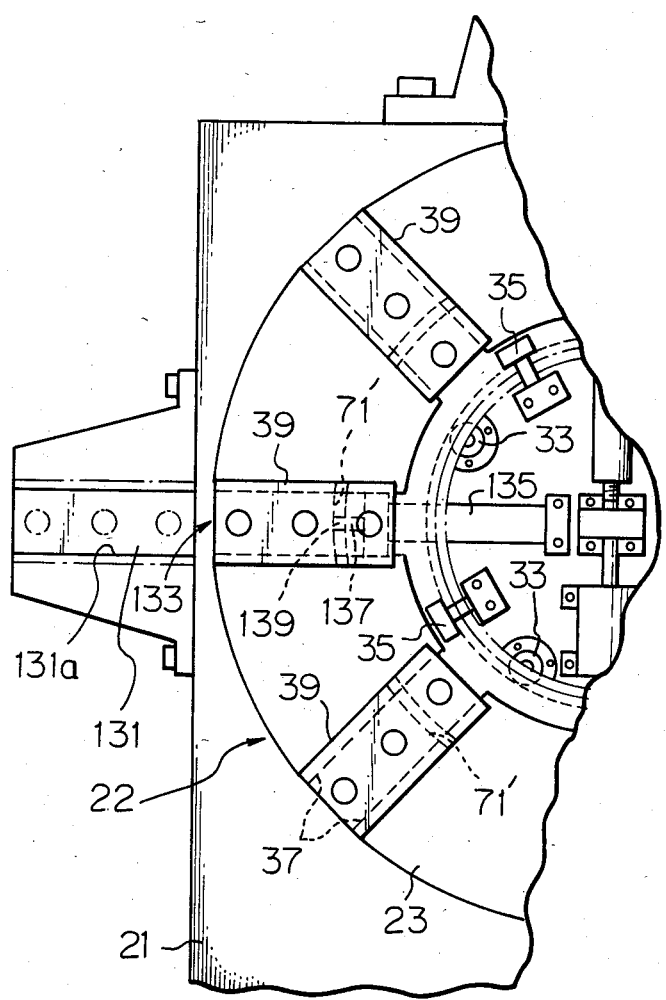
FIG. 6 is a partial front elevational view of a different arrangement from FIG. 4, in which arrangement no auxiliary tool magazine is provided.

As mentioned before, the carriage 150 and the auxiliary tool magazine 154 can be dispensed with. A first alternative in which neither the carriage nor the auxiliary tool magazine are provided will be discussed below, with reference to FIG. 6. In FIG. 6, a second cartridge guide device 131 with a second cartridge receiving channel 131a is provided on and secured to the base 21. When the magazine body 23 is indexed in the aforementioned way so that a desired cartridge 39 comes to a second magazine index position 133, in which a front end projection 139 of a piston 137 of a hydraulic cylinder device 135 provided between the magazine body 23 and the base 21 comes into engagement with recess 71' provided in the cartridge 39. This construction is similar to that of the indexing lever 75 (FIG. 4). The recesses 71' are arch-shaped as shown in FIG. 6 when viewed in a plan view. The projection 139 has a corresponding arch-shaped profile in a plan view so that it can smoothly enter the recess 71' of the associated cartridge when the magazine body 23 rotates. Alternatively, the recesses 71' may be the receses 71 with the wide inlet and outlet ends as shown in FIG. 4. The cylinder device 135 actuates to move the piston 137, so that the cartridge 39 in the second index position 133 moves into the second cartridge receiving channel 131a of the second cartridge guide device 131.

It should be noted that even when the cartridge 39 is in the second cartridge guide device 131, the cartridge body 23 can be indexed, if necessary, since the piston 137 and the cylinder device 135 do not intefere with the rotation of the magazine body 23. The cartridge 39 accommodated in the second cartridge guide device 131 can be easily returned into the magazine body 23, i.e., into the recess 37 of the magazine body which is indexed at the second index position 133, by the retraction of the piston 137 of the cylinder device 135. Thus, the cartridge can be easily brought from the magazine body 23 into the second cartridge guide device 131, and vice versa. The tool or tools in the socket(s) of the cartridge 39 which is in the second cartridge guide device 131 can be manually replaced by new tool or tools. Namely, the second cartridge guide device 131 enables an operator to easily and safely exchange an old tool for a new tool, since the exchange is effected outside the main tool magazine.

A second alternative in which the exchange of the tools can be automatically effected by the auxiliary tool magazine 154 on the carriage 150, in place of the manual operation mentioned above will now be discussed in detail. FIG. 4 shows a first embodiment of the arrangement of the auxiliary tool magazine 154. In FIG. 4, the carriage 150 which is, for example, movable between the machine tool and the tool storage (not shown) is located in the vicinity of the associated machine tool and is positioned at the tool change position in which the cartridge can move from the main tool magazine into the auxiliary tool magazine 154 and vice versa.

Also in FIG. 4, one vacant cartridge receiving chamber 152 of the auxiliary tool magazine 154 is indexed at a cartridge receiving and transmitting position 158. A desired cartridge 39 in the main tool magazine 22 is indexed into the second index position 133 corresponding to the cartridge receiving and transmitting position of the auxiliary tool magazine 154. When the desired cartridge 39 is indexed at the second index position 133, the projection 139 of the piston 137 comes into engagement with the recess 71 of the cartridge 39, as mentioned before. Then, the cylinder device 135 operates to move the piston 137, so that the cartridge 39 is forced out from the recess 37 of the main tool magazine 22 into the vacant cartridge receiving chamber 152 of the auxiliary tool magazine 154 which is in the cartridge receiving and transmitting position 158.

On the other hand, the cartridge 39 in the auxiliary tool magazine 154 is transferred into the main tool magazine 22 in the following way. The auxiliary tool magazine 154 is rotated and indexed to bring the desired cartridge to the cartridge receiving and transmitting position 158, while leaving the piston 137 of the cylinder device 135 at the extended position in which projection 139 of the piston 137 can engage with the recess 71 of the cartridge 39. Therefore, when the desired cartridge in the auxiliary tool magazine 154 comes to the position 158, the projection 139 of the piston 137 comes into the recess 71 of the desired cartridge. After that, the piston is retracted by the operation of the cylinder device 135 to withdraw the cartridge 39 from the cartridge receiving chamber 152 of the auxiliary tool magazine. The cartridge 39 withdrawn from the auxiliary tool magazine is received in the recess 37 of the main tool magazine 22, which is vacant since the cartridge has been transferred to the auxiliary tool cartridge 154 in the previous stage, as aforementioned.

It goes without saying that it is also possible to feed the cartridge into a previously vacant recess 37 of the main tool magazine from the auxiliary tool magazine 154. In this case, the vacant recess 37 of the main tool magazine is first indexed into the second index position 133, then the cylindrical device 135 operates to move the piston 137, so that the piston extends through the vacant recess 37 of the main tool magazine 22. After that, the auxiliary tool magazine 154 is indexed so that the cartridge to be fed into the vacant recess 37 of the main tool magazine comes to the cartridge receiving and transmitting position 158. At this moment, the projection 139 of the piston 137 comes into the recess 71 of the cartridge 39.

The cartridge receiving chambers 152 of the auxiliary tool magazine 154 are of substantially the same construction as those of the recesses 37 of the main tool magazine 22 so that the cartridge 39 can easily and smoothly slide in the cartridge receiving chambers with the help of the guide grooves 55 (FIG. 5) of the cartridges 39 without accidentally coming out therefrom.

Figure 7:
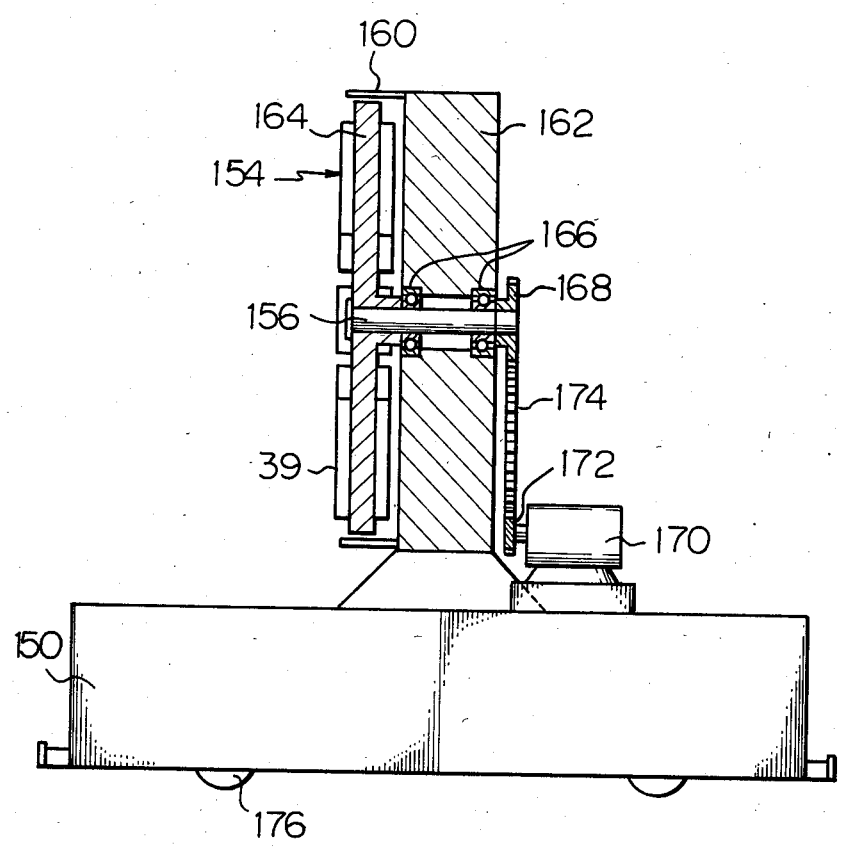
FIG. 7 is a sectional view of an auxiliary tool magazine taken along the line VII—VII in FIG. 1.

FIG. 7 is a sectional view taken along the line VII—VII in FIG. 1, showing the construction of the auxiliary tool magazine 154. In FIG. 7, the auxiliary tool magazine 154 located on the carriage 150 has a circular base (body) 162 with an annular cover 160 projecting forward and a tool magazine base plate 164 in the annular cover 160. The cover 160 has an open portion 160a (FIG. 4) corresponding to the cartridge receiving and transmitting position 158 to allow the cartridge to pass through the open portion 160a. The cartridge receiving chambers 152 (FIG. 1) are formed in the base plate 164. The base plate 164 has the rotational shaft 156 which is rotatably supported by bearings 166 provided in the body 162. The rotational shaft 156 is provided, on its rear end, with a sprocket wheel 168 rigidly connected thereto. The sprocket wheel 168 is connected to a sprocket wheel 172 secured to a drive shaft of an indexing motor 170 located on the carriage 150, through a sprocket chain 174. Therefore, the indexing motor 170 drives to rotate and index the tool magazine base plate 164, in order to bring one desired cartridge 39 to the cartridge receiving and transmitting position 158 (FIG. 1). The indexing motor 170 receives a control signal from a control unit (not shown) through signal lines to index and rotate the tool magazine base plate 164. The carriage 150 can move, for example, on a floor by means of the wheels 176 which are, for example, rotated by a drive motor (not shown) contained in the carriage 150.

Figure 8:
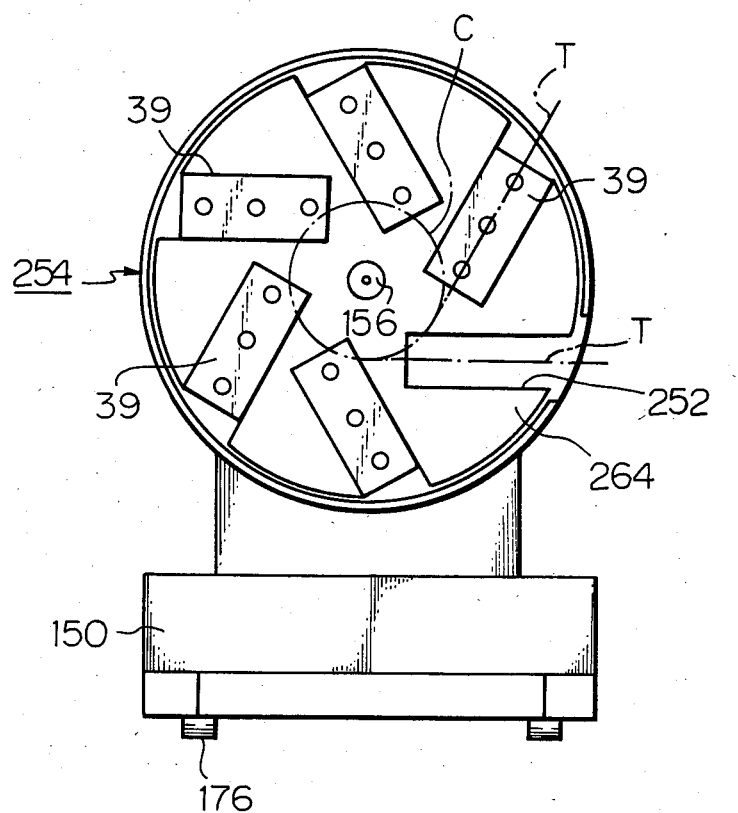
FIG. 8 is a front elevational view of a different auxiliary tool magazine.

FIG. 8 shows a different embodiment of an auxiliary tool magazine 254. In FIG. 8, the arrangement of the cartridge receiving chambers 252 formed in the tool magazine base plate 264 is different from that in FIG. 7. Other constructions are substantially the same as in FIG. 7. In FIG. 8, the cartridge receiving chambers 252 are arranged in such a way that the center axes of the chambers 252 are on tangential lines T with respect to a circle C which has a predetermined radius and which has a center on an axis of the shaft 156 of the base plate 264. With this tangential arrangement, it is possible to provide a spatial relationship between the cartridges, so that when the cartridges 39 are received in the respective cartridge receiving chambers 252, tools in the two adjacent cartridges 39 do not interfer with each other even if the tools are of large size. The provision of such a spatial relationship has a remarkable effect, particularly for the portions of the auxiliary tool magazine 254 that are located adjacent to the center thereof, since, otherwise, the distances between the innermost tools in the two adjacent cartridges are smallest, as can be seen in FIG. 4.

As can be seen from FIG. 8, the cartridges come to a horizontal position in which the axes thereof extend in the horizontal direction at a certain index position once during the rotation of the auxiliary tool magazine 254. Therefore, the above-mentioned certain index position is set as the cartridge receiving and transmitting position 158 (FIG. 4). Furthermore, the height of the cartridge receiving and transmitting position 158 is determined in advance so that it is in alignment with the second index position 133 of the main tool magazine 22 (FIG. 4).

Figure 9:
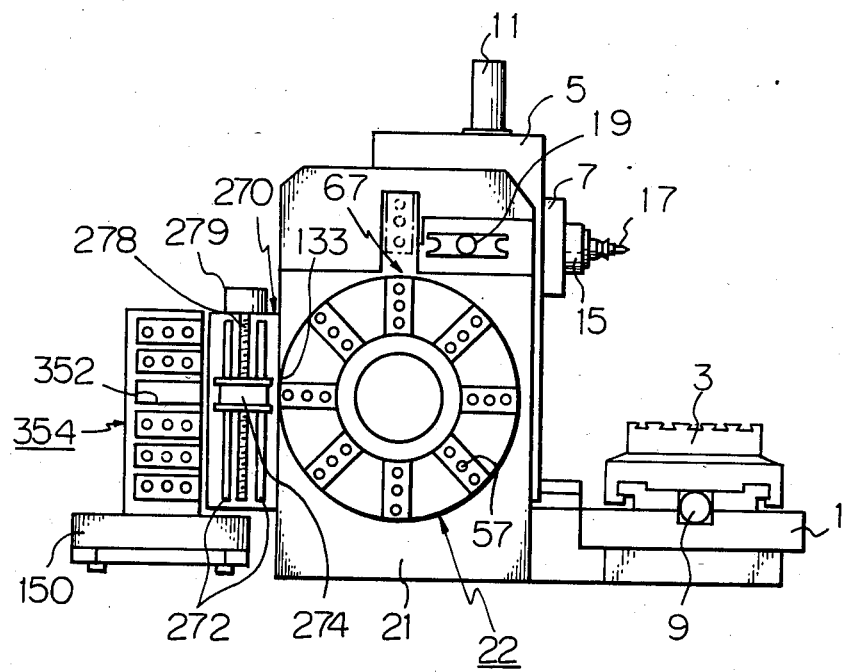
FIG. 9 is a front elevational view of a tool changing machine with a still different auxiliary tool magazine.

FIG. 9 shows a different embodiment of an auxiliary tool magazine 354. In FIG. 9, an intermediate transferring device 270 forming a cartridge transferring intermediate station is provided on and fixed to the side face of the base 21. The intermediate transferring device 270 has vertical guide rods 272 and a cartridge receiver 274 which moves up and down along and on the guide rods 272. The cartridge receiver 274 can be moved by, for example, an actuator, such as a screw rod-nut mechanism 278 with a motor 279, similar to the screw rod 79 and the nut 77, as shown in FIG. 3. When the cartridge receiver 274 is in alignment with the second index position 133 of the main tool magazine 22, transfer of the cartridge can be effected between the cartridge receiver 274 and the main tool magazine 22.

In FIG. 9, the auxiliary tool magazine 354 has the carriage 150 similar to the aforementioned embodiments, but is different in construction from the auxiliary tool magazine 154 or 254 in the aforementioned embodiments. Namely, the auxiliary tool magazine 354 is of a rack or shelf type, having a plurality of multi-layered cartridge receiving chambers 352. When the auxiliary tool magazine 354 comes close to and in front of the intermediate transferring device 270, by means of the carriage 150 moving on the floor, transfer of the cartridge between the intermediate transferring device 270 and the auxiliary tool magazine 354 can be effected. Namely, the cartridge receiver 274 of the intermediate transferring device 270 moves up or down by means of the screw rod-nut mechanism 278 which is driven by the motor 279 on the intermediate transferring device 270, so that the cartridge receiver 274 comes in alignment with a desired cartridge receiving chamber 352, for example, a vacant cartridge receiving chamber 352 of the auxiliary tool magazine. Therefore, the cartridge in the cartridge receiver 274 can be transferred into the vacant cartridge receiving chamber 352, or the cartridge in the cartridge receiving chamber 352 can be transferred into the vacant cartridge receiver 274.

Figure 10:
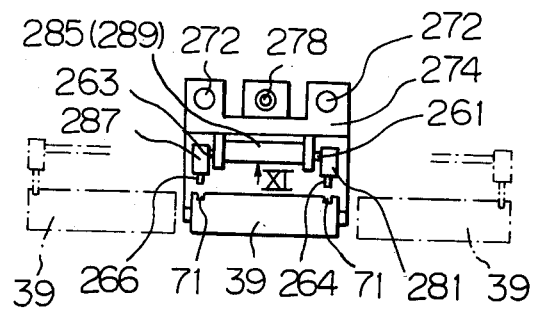
FIG. 10 is a schematic plan view of an actuator for effecting transfer of the cartridge between a cartridge receiver and a main tool magazine or an auxiliary tool magazine, shown in FIG. 9.

The cartridge receiver 274 has actuators, such as hydraulic cylinders 285 and 289 as shown in FIG. 10, for moving the cartridge in the horizontal directions between the cartridge receiver and the main tool magazine and between the cartridge receiver and the auxiliary tool magazine.

Figure 11:
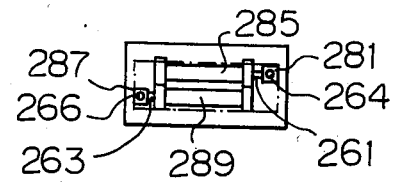
FIG. 11 is a front elevational view of actuators shown in FIG. 10, when viewed from the direction XI in FIG. 10.

One example of the actuators is illustrated in FIGS. 10 and 11. The cartridge receiver 274 has two hydraulic cylinders 285 and 289 each having respective pistons 261 and 263 extending in the directions of movement of the cartridge 39. The pistons 261 and 263 have hydraulic cylinders 281 and 287 with pistons 264 and 266 extending perpendicular to the pistons 261 and 263. The hydraulic cylinders 285, 289, 281, and 287 are controlled by a control unit (not shown). In the embodiment shown in FIG. 10, each cartridge has two recesses 71, so that when the cylinder 281 or 287 operates, the piston 264 or 266 of the respective cylinder comes into engagement with the corresponding recess 71 of the cartridges 39. When the cylinder 285 or 289 operates, the cartridge 39 is moved in the right hand or left hand direction, as shown by imaginary lines in FIG. 10.

With the provision of the intermediate transferring device 270 as shown in FIG. 9, not only can the auxiliary tool magazine be of a simple rack or shelf type, but also the invention can be applied to various sizes of machine tools, from large to small, since even if the cartridge receiving and transmitting positions are different from each other, depending on the size of the machine tools or the size of the main tool magazines thereof, the cartridge receiver 274 can compensate for the difference in size by mere up-and-down movement of the cartridge receiver 274.

It should be noted that the intermediate transferring device 270 is applicable not only to the auxiliary tool magazine 354 shown in FIG. 9, but also to the auxiliary tool magazines 154 and 254 shown in FIGS. 1 and 8.

Figure 12:
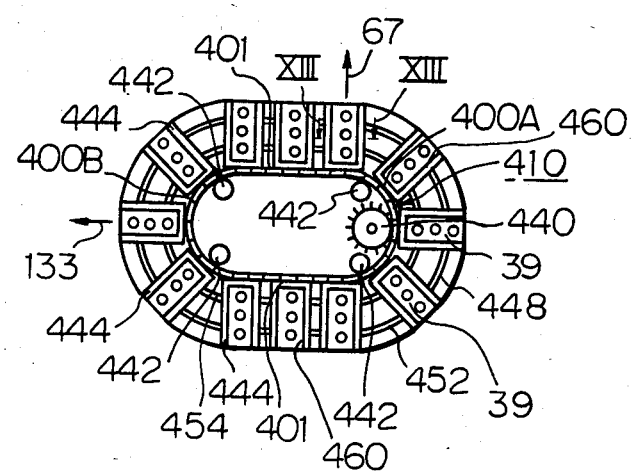
FIG. 12 is a schematic front elevational view of a variant of a main tool magazine.
Figure 13:
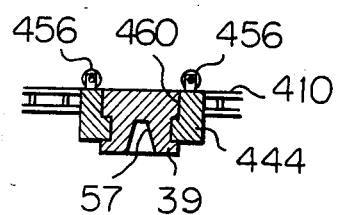
FIG. 13 is a sectional view taken along the line XIII—XIII in FIG. 12.

The main tool magazine 22 is circular in the illustrated embodiments mentioned above, but may be oval shape, in accordance with the number of the tools accommodated in the cartridges or the size of space in which it is installed. In such an oval (or ellipse) main tool magazine, it includes an endless chain 410 the profile of which includes two halves 400A and 400B of a circle and intermediate linear portions 401 connecting the two halves when viewed from the front elevation, as shown in FIG. 12. The cartridges 39 are radially arranged with respect to the respective center of the circles in the two halves 400A and 400B and are vertically arranged in the rectangular portions defined by the linear portions 401, respectively.

The oval main magazine (i.e., the chain 410) shown in FIG. 12 can be rotated with respect to the base 21 by means of a drive sprocket wheel 440 which is driven by the motor 63 (FIG. 4) so as to bring the cartridges to the first index position 67 and to the second index position 133. Reference numeral 442 shows idler wheels.

The base 21 has a stationary oval plate 448 which has guide rails 452 and 454 which receive therein rollers 456 provided on cartridge holders 444. That is, the cartridge holders 444 roll in the guide rails 452 and 454, with the help of the rollers 456, when the chain 410 rotates along the oval track. The cartridge holders 444 have recessed bodies which are rigidly connected to the chain 410 so as to rotate together with the chain 410. The recessed bodies have generally U-shaped grooves 460 which movably receive the cartridges 39.

It is possible to provide in the carriage 150 a drive (not shown) which operates in accordance with control signals from the aforementioned control unit (not shown) by remote control. Alternatively, it is possible to provide an automatically driven carriage moving device, such as a moving footpath, which extends along a predetermined path on the floor.

As can be seen from the above, according to the present invention, there is provided a circular or oval main tool magazine in which a large number of tools are radially arranged with a high packaging density and without making the main tool magazine larger. Furthermore, according to the present invention, the main tool magazine can be easily indexed into the first index position, where the tool change is effected between the main tool magazine and the first cartridge guide device, merely by rotating the magazine body of the main tool magazine. Accordingly, no special space for displacement, e.g., slide movement of the tool magazine, is necessary.

In addition to the above, the main tool magazine can be easily indexed into the second index position where the tool change is effected between the main tool magazine and the second cartridge guide device or the auxiliary tool magazine. Accordingly, the removal or feed of old tools or new tools from or into the second cartridge guide device or the auxiliary tool magazine can be easily and safely effected outside the associated machine tool.

Furthermore, according to the present invention, since the tool change is effected by changing cartridges which accommodate a set number of tools, for example, three tools, between the main tool magazine and the second cartridge guide device or the auxiliary tool magazine, change of used tools by desired new ones, removal of old tools or broken tools, and additional feeding of necessary tools can be effectively achieved in a short time. This leads to an increase of efficiency of the machine tool itself.

A large number of tools can be stored also in the auxiliary tool magazine. Therefore, the carriage for moving the auxiliary tool magazine can be compact, simple, and light and can be operated with a small power motor.

I claim:

1. A machine for tool changing between a machine tool with a spindle, having a main tool magazine which has a plurality of cartridges each having a plurality of tool sockets for receiving tools, and an auxiliary tool magazine outside the machine tool having cartridge receiving chambers, comprising a carriage for moving the auxiliary tool magazine so as to come close to or away from the machine tool, means for transferring the cartridges between the main tool magazine and the auxiliary tool magazine, said auxiliary tool magazine being supported by the carriage, said main tool magazine comprising a rotatable magazine body in which the cartridges are arranged radially with respect to the rotation of the magazine body, means for indexing the main tool magazine into an index position for effecting a tool change between the spindle of the machine tool and the main tool magazine and into a second index position for effecting a tool change between the main tool magazine and the auxiliary tool magazine, said auxiliary tool magazine having a circular body in which the cartridge receiving chambers are formed to radially extend, and means for indexing the cartridges into a predetermined angular position defining a cartridge receiving and transferring position which is in alignment with the index position of the main tool magazine.

2. A tool changing machine according to claim 1, wherein said transferring means comprises a hydraulic cylinder device on an immovable portion of the machine tool, and a piston which is connected to the cylinder device to operate by the operation of the cylinder device, so that the piston comes into engagement with the cartridges.

3. A machine for tool changing between a machine tool with a spindle, having a main tool magazine which has a plurality of cartridges each having a plurality of tool sockets for receiving tools, and an auxiliary tool magazine outside the machine tool having cartridge receiving chambers, comprising a carriage for moving the auxiliary tool magazine so as to come close to or away from the machine tool, means for transferring the cartridges between the main tool magazine and the auxiliary tool magazine, said auxiliary tool magazine being supported by the carriage, said main tool magazine comprising a rotatable magazine body in which the cartridges are arranged radially with respect to the rotation of the magazine body, means for indexing the main tool magazine into an index position for effecting a tool change between the spindle of the machine tool and the main tool magazine and into a second index position for effecting a tool change between the main tool magazine and the auxiliary tool magazine, said auxiliary tool magazine having a circular body in which the cartridge receiving chambers are formed to extend along tangential lines with respect to a circle having a center on the center of the rotation of the auxiliary tool magazine, and means for indexing the cartridges into a predetermined angular position defining a cartridge receiving and transferring position which is in alignment with the index position of the main tool magazine.

4. A machine for tool changing between a machine tool with a spindle, having a main tool magazine which has a plurality of cartridges each having a plurality of tool sockets for receiving tools, and an auxiliary tool magazine outside the machine tool having cartridge receiving chambers, comprising a carriage for moving the auxiliary tool magazine so as to come close to or away from the machine tool, means for transferring the cartridges between the main tool magazine and the auxiliary tool magazine, said auxiliary tool magazine being supported by the carriage, said main tool magazine comprising a rotatable magazine body in which the cartridges are arranged radially with respect to the rotation of the magazine body, means for indexing the main tool magazine into an index position for effecting a tool change between the spindle of the machine tool and into a second index position for effecting a tool change between the main tool magazine and the auxiliary tool magazine, said cartridge transferring means comprising an intermediate station between the main tool magazine and the auxiliary tool magazine, transferring means for transferring the cartridges between the main tool magazine and the intermediate station and between the intermediate station and the auxiliary tool magazine, and a cartridge receiver which is movable up and down.

* * * * *